US012753889B2

(12) United States Patent
Zhao et al.

(10) Patent No.: US 12,753,889 B2
(45) Date of Patent: Oct. 6, 2026

(54) RECESSED LIGHTING WITH A REINFORCED COLLAR

(71) Applicant: SIGNIFY HOLDING B.V., Eindhoven (NL)

(72) Inventors: Wei Zhao, Shanghai (CN); Zhihong Lin, Shanghai (CN); Ramanand Radhakrishna Kamath, Peachtree City, GA (US); Jared Michael Davis, Newnan, GA (US); Kyle Talmadge Lowery, Peachtree City, GA (US); Andree Goyzueta, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/096,806

(22) Filed: Apr. 1, 2025

(65) Prior Publication Data

US 2026/0298425 A1 Oct. 1, 2026

(51) Int. Cl.

| | |
|---|---|
| *F21S 8/02* | (2006.01) |
| *F21V 7/04* | (2006.01) |
| *F21V 17/06* | (2006.01) |
| *F21Y 115/10* | (2016.01) |

(52) U.S. Cl.

CPC .............. *F21S 8/026* (2013.01); *F21V 7/041* (2013.01); *F21V 17/06* (2013.01); *F21Y 2115/10* (2016.08)

(58) Field of Classification Search

CPC .......... F21S 8/026; F21V 7/041; F21V 17/06; F21Y 2115/10

See application file for complete search history.

(56) References Cited

U.S. PATENT DOCUMENTS

| | | | | |
|---|---|---|---|---|
| 9,702,516 | B1 * | 7/2017 | Vasquez | F21V 17/166 |
| 10,801,681 | B1 | 10/2020 | Chaimberg et al. | |
| 11,739,893 | B2 * | 8/2023 | Cohen | F21S 8/02 362/382 |
| 2013/0294084 | A1 * | 11/2013 | Kathawate | F21S 8/024 362/257 |
| 2018/0224095 | A1 | 8/2018 | Cohen | |
| 2019/0301706 | A1 | 10/2019 | Zhou et al. | |
| 2020/0072444 | A1 | 3/2020 | Bokros et al. | |
| 2020/0080706 | A1 * | 3/2020 | Nobis | F21S 8/026 |
| 2021/0231273 | A1 * | 7/2021 | Siegel | F21V 21/03 |
| 2024/0288133 | A1 | 8/2024 | Suttle et al. | |

* cited by examiner

*Primary Examiner* — Tsion Tumebo

(57) ABSTRACT

To overcome thermal issues created by the warping of a reflector flange in a recessed lighting luminaire, a recessed lighting luminaire that includes an LED module, a reflector, a reflector flange, and a steel reflector flange collar is described. The reflector flange is connected underneath the LED module with clips, the LED module shining light through the reflector, the reflector including a reflector flange and a reflector housing. The reflector flange is mounted at the top of the reflector housing. A reflector flange collar is attached underneath the reflector flange with an attachment mechanism, and a plurality of mousetrap connectors mechanically adhere to the reflector flange and the reflector flange collar. Each of the plurality of mousetrap connectors including a mousetrap spring and a mousetrap support, the mousetrap support configured to hold the recessed lighting luminaire to a ceiling.

16 Claims, 5 Drawing Sheets

RECESSED LIGHTING WITH A REINFORCED COLLAR

FIELD OF THE INVENTIONS

This document relates to luminaires, and more specifically, to the field of the design of recessed lighting fixtures.

BACKGROUND

Recessed lighting fixtures are built into the ceiling of a building. Recessed lighting fixtures have mousetrap supports that include springs to hold the fixtures in place. Such springs can warp components of the lighting fixtures, causing light leakage and a reduction in thermal conduct. Thermal conductivity is important as the heat from the lighting fixture is transferred down the reflectors to trim for dispersion.

BRIEF SUMMARY

A solution that reduces light leakage and increases thermal dispersion is described herein.

In one aspect, a recessed lighting luminaire includes an LED module, a reflector, connected underneath the LED module with clips, the LED module shining light through the reflector, the reflector including a reflector flange and a reflector housing, the reflector flange mounted at a top of the reflector housing, a reflector flange collar attached underneath the reflector flange with an attachment mechanism, and a plurality of mousetrap connectors mechanically adhered to the reflector flange and the reflector flange collar, each of the plurality of mousetrap connector including a mousetrap spring and a mousetrap support, the mousetrap support configured to hold the recessed lighting luminaire to a ceiling.

The recessed lighting luminaire may also include where the attachment mechanism is a screw. The recessed lighting luminaire may also include where the attachment mechanism is a rivet. The recessed lighting luminaire may also include where the reflector flange collar is made of steel. The recessed lighting luminaire may also include where the reflector flange collar is round with a circular opening. The recessed lighting luminaire may also include where the reflector flange is aluminum. The recessed lighting luminaire may also include where the attachment mechanism attaches the reflector flange, the reflector flange collar, and the mousetrap support together. The recessed lighting luminaire may also include where the reflector is conal. The recessed lighting luminaire may also include an upper reflector between the LED module and the reflector. The recessed lighting luminaire may also include where the reflector flange collar is two parts. The recessed lighting luminaire may also include where the two parts of the reflector flange collar separate at two opposite points on the circular opening, the two opposite points include an interlocking pattern with a male rounded tab on one end and a female opening on an opposite end matching the male rounded tab. The recessed lighting luminaire may also include a lens between the upper reflector and the reflector. Other technical features may be readily apparent to one skilled in the art from the following figures, descriptions, and claims.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

In the following paragraphs, particular embodiments will be described in further detail by way of example with reference to the figures. In the description, well known components, methods, and/or processing techniques are omitted or briefly described. Dimensions used herein are used as an example, and could vary without deviating from the inventions described here. Furthermore, reference to various feature(s) of the embodiments is not to suggest that all embodiments must include the referenced feature(s).

Figure 1:
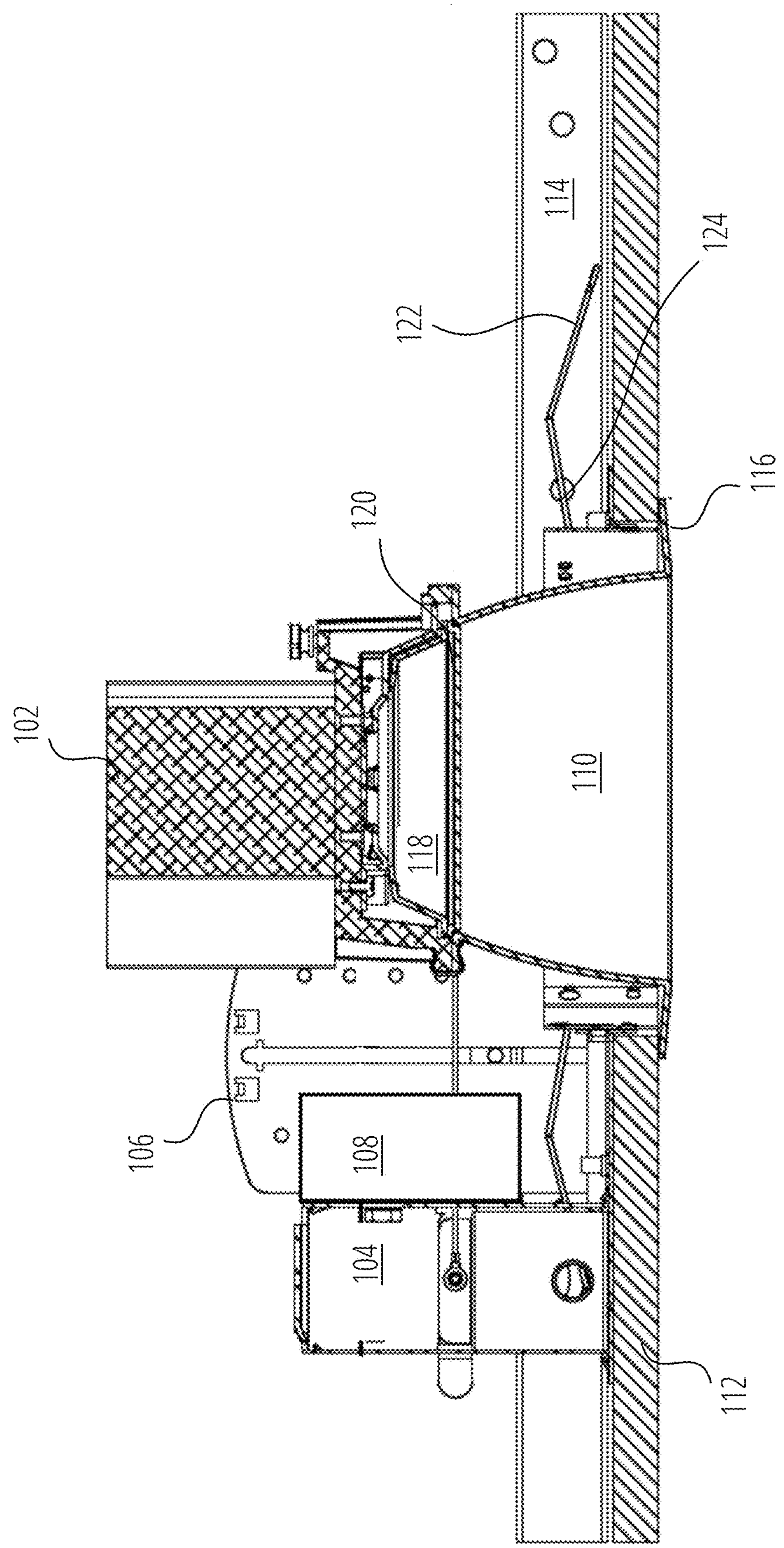
FIG. 1 shows a cross section of a recessed lighting luminaire mounted in a ceiling.

FIG. 1 shows a luminaire for mounting above a ceiling 112 as a recessed lighting unit. The LED module 102 may be mounted on the top of a reflector 110 and may provide the light for the room below the ceiling 112. The light from the LED module 102 may beam down through the upper reflector 118 and lens 120 into the reflector 110 where it could be directed into the room through the trim flange 116. The trim flange 116 could help support luminaire and direct the unit to a specific position. The trim flange 116 helps to prevents the entire luminaire unit from being pulled up into the ceiling 112 when the mousetrap supports 206 are engaged. The trim flange 116 also acts as a decorative finish and may prevent air flow . . . . An electrical box 104 may connect to the building power and provide power to the control module 108 and to the LED module 102. In some embodiments, the electrical box 104 is 87 mm high. In some embodiments, the ceiling 112 is 13 mm in width. The LED module 102 could be 76 mm high and have a diameter of 82 mm.

The reflector 110 may be 114 mm at the bottom, 84 mm at the top, and 63 mm high. The reflector 110 may be a cone shape. In some embodiments, the reflector 110 is made of aluminum. In some embodiments, the reflector 110 may be made of four aluminum reflector panels. In some embodiments, the aluminum for the reflector 110 may be polished to present a reflective surface. In some embodiments, the aluminum for the reflector 110 may be painted. In some embodiments, the reflector 110 may be made of a non-conductive material like plastic.

The luminaire assembly may be mounted on a mounting frame 114 that rests on the ceiling 112 and optionally may be connected to the building structure with hanger bar brackets 106. Mousetrap supports 122 may be connected to the reflector 110 with mousetrap springs 124 to hold the assembly tight to the ceiling 112. The mounting frame 114 is optional. In some embodiments, the luminaire may be directly installed into the cutout on the ceiling 112. Torsions spring supports 122 may be connected to the reflector 110 with torsion springs 124 to hold the assembly tight to the ceiling 112.

Figure 2:
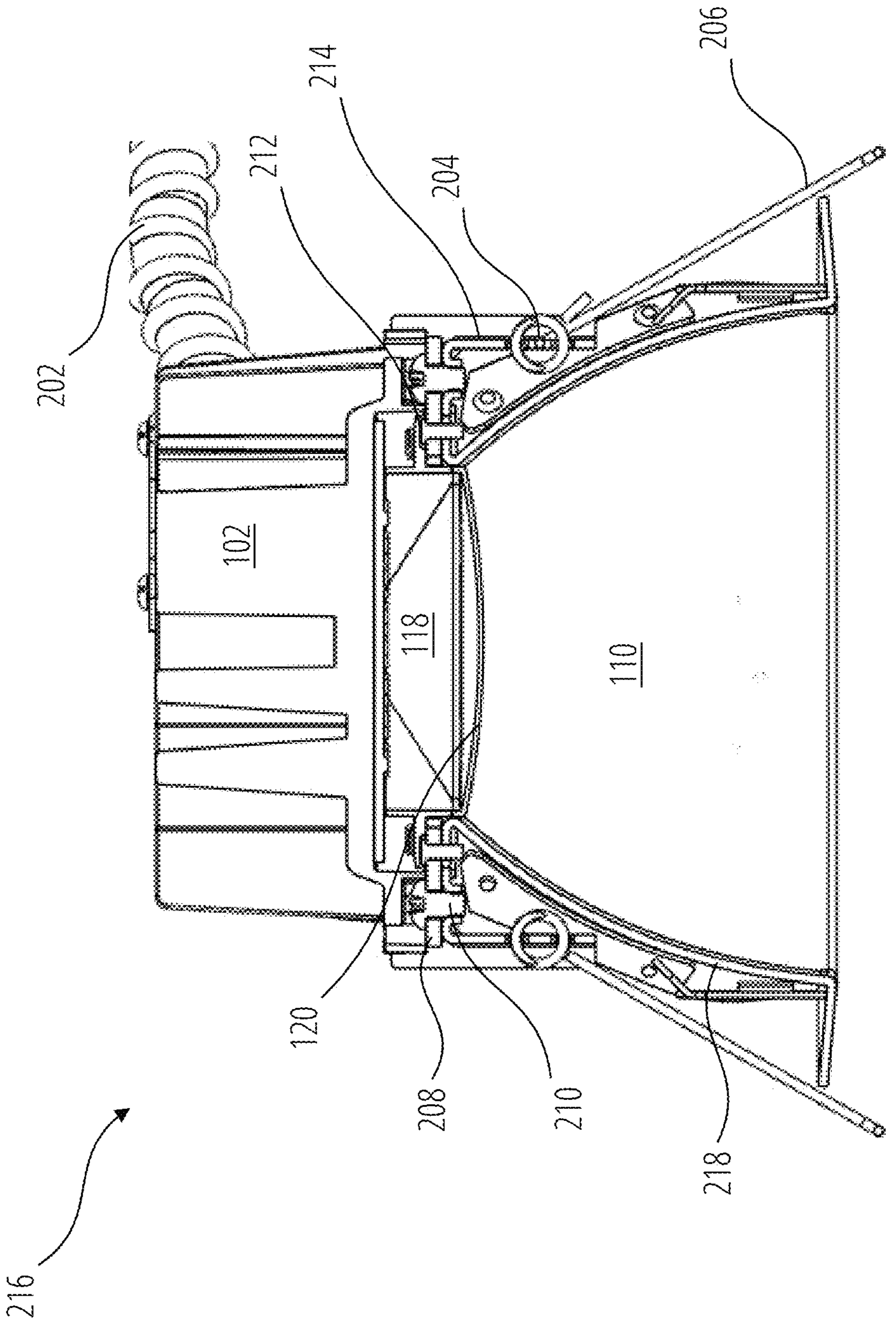
FIG. 2 illustrates recessed lighting unit can.

FIG. 2 is a focused view of the recessed lighting luminaire 216 assembly. Power wires 202 could deliver power to the LED module 102. The LED module 102 focuses light into the upper reflector 118, through the lens 120, and into the reflector 110 where the light is focused in a specific direction.

The reflector 110 is an assembly of the reflector housing 218 and the reflector flange 208, connected with rivets 212 and/or screws 210, in some embodiments. In other embodiments, the reflector housing 218 can be adhered to the reflector flange 208 with adhesives, spot welds, welding, or the reflector flange 208 and the reflector housing 218 could be molded together. In some embodiments, the mousetrap connectors 214 are also adhered to the reflector flange 208 and the reflector housing 218. In some embodiments, the reflector 110 is soft-spun aluminum. In some embodiments, the reflector flange 208 is soft-spun aluminum. In some embodiments, the reflector 110 is conal in shape and may be 114 mm at the bottom, 84 mm at the top, and 63 mm high. In some embodiments, the aluminum for the reflector 110 may be polished to present a reflective surface. In some embodiments, the aluminum for the reflector 110 may be painted. In some embodiments, the reflector 110 may be made of a non-heat-conductive material like plastic. The plastic may be opaque polycarbonate or any other alternate plastic (e.g. ABS (acrylonitrile butadiene styrene), PS (polystyrene), PP (polypropylene), PE (polyethylene), PVC (polyvinyl chloride), PMMA (polymethyl methacrylate)). In another embodiment, the reflector 110 may be substantially rectangular. In a round embodiment, the reflector 110 may have a top diameter of 84 mm and a 113 mm diameter at the bottom. In a rectangular embodiment, the reflector 110 may be 84 mm per side at the top and 113 mm per side at the bottom. The height of the reflector 110 may be 63 mm.

The reflector flange 208 may be circular or rectangular in shape. The reflector flange 208 may have a circular internal hole, or the internal hole may be substantially rectangular in shape. in some embodiments, the reflector flange 208 is made of soft-spun aluminum, steel, opaque polycarbonate or any other alternate plastic (e.g. ABS (acrylonitrile butadiene styrene), PS (polystyrene), PP (polypropylene), PE (polyethylene), PVC (polyvinyl chloride), PMMA (polymethyl methacrylate)). The outer diameter of the reflector flange 208 may be 90 mm (90 mm square for the rectangular embodiment). The inner diameter of the reflector flange 208 could be 66 mm (or 66 mm wide in the rectangular embodiment).

Mousetrap connectors 214 connect to the reflector flange 208 and to the mousetrap springs 204. The connection between the mousetrap connector 214 and the mousetrap spring 204 could be through a pin extending through the center of the mousetrap spring 204, the pin connected at one or both ends to the mousetrap connector 214. The mousetrap support 122 could be an extension of the mousetrap spring 204. The mousetrap spring 204 could be made of spring wire, the spring wire could be made from stainless steel, phosphor bronze, beryllium copper, chrome silicon, or high carbon spring steel, for example. The mousetrap supports 122 could be 65 mm in length and 10 mm wide.

In some embodiments, reflector flange collars 502, 504 are added between the reflector flange 208 and the reflector housing 218 to increase the stiffness of the reflector flange 208 as the mousetrap supports 206 are extended, asserting force on the mousetrap connectors 214 due to the mousetrap springs 204. This force can make the reflector flange 208 warp with the force, causing uneven contact between the reflector flange 208, the LED module 102, and the reflector housing 218. The reflector flange collars 502, 504 also increase the thermal dispersion from the LED module 102 down into the reflector 110. The reflector flange collars 502, 504 could be round in some embodiments and rectangular in other embodiments. Other shapes are also possible. The reflector flange collars 502, 504 could have an outer diameter of 90 mm and an inner diameter of 66 mm (90 mm square in some rectangular embodiments on the outer dimensions and 66 mm on the inside). The reflector flange collars 502, 504 are shown in two parts in these drawings, but the reflector flange collars 502, 504 could be any number of pieces, including a single piece.

Figure 3:
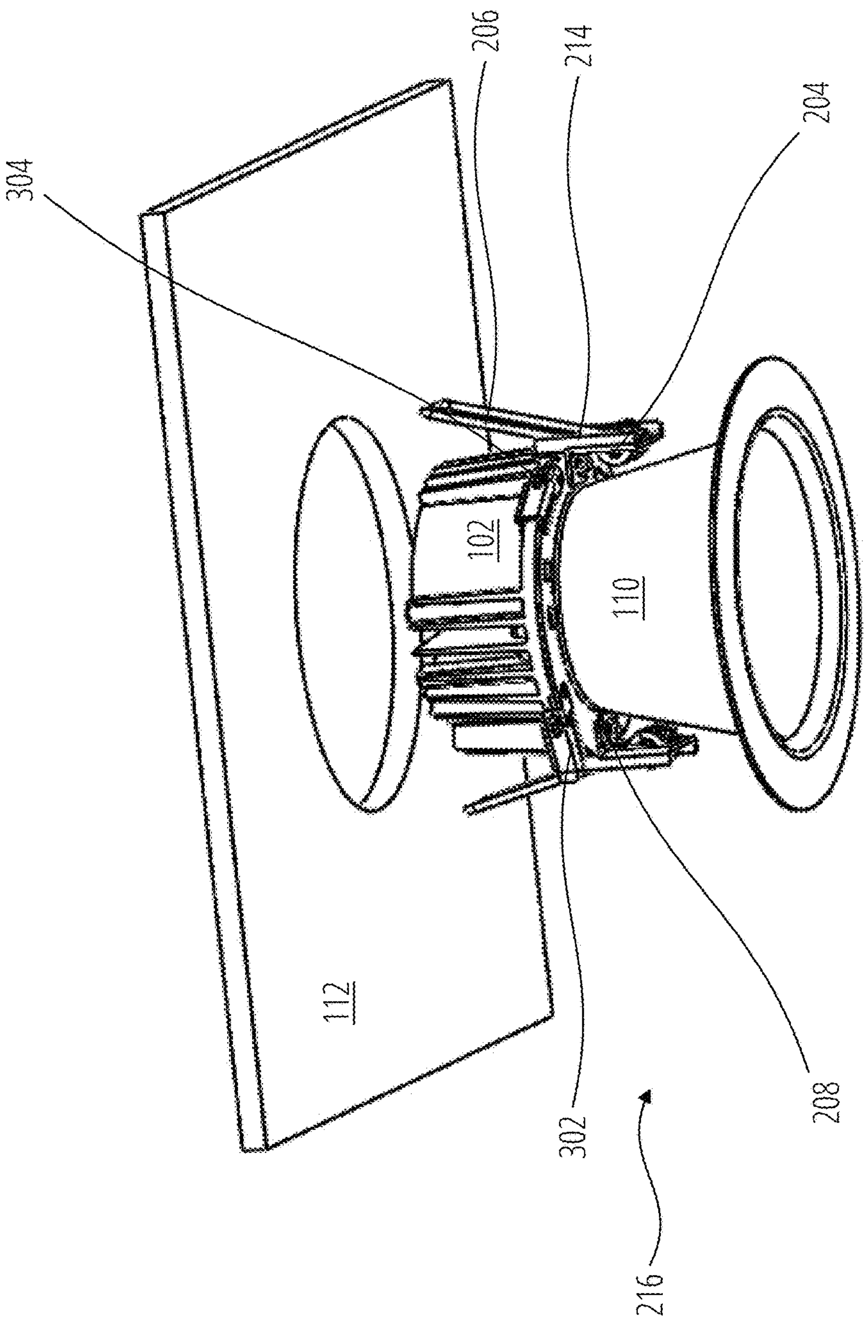
FIG. 3 illustrates the recessed lighting luminaire as it in inserted in the ceiling.

FIG. 3 shows the recessed lighting luminaire 216 as it is ready to insert into a hole the ceiling 112. Once inserted, the mousetrap supports 206 are dropped to a lower position, and hold the recessed lighting luminaire 216 in position in the ceiling 112. Two or three (or more) of the attachment clips 302, 304, 402 are used to clip the LED module 102 to the reflector flange 208, keeping the two components together. In some embodiments, these attachment clips 302, 304 are hinged mechanical slide clips.

Figure 4:
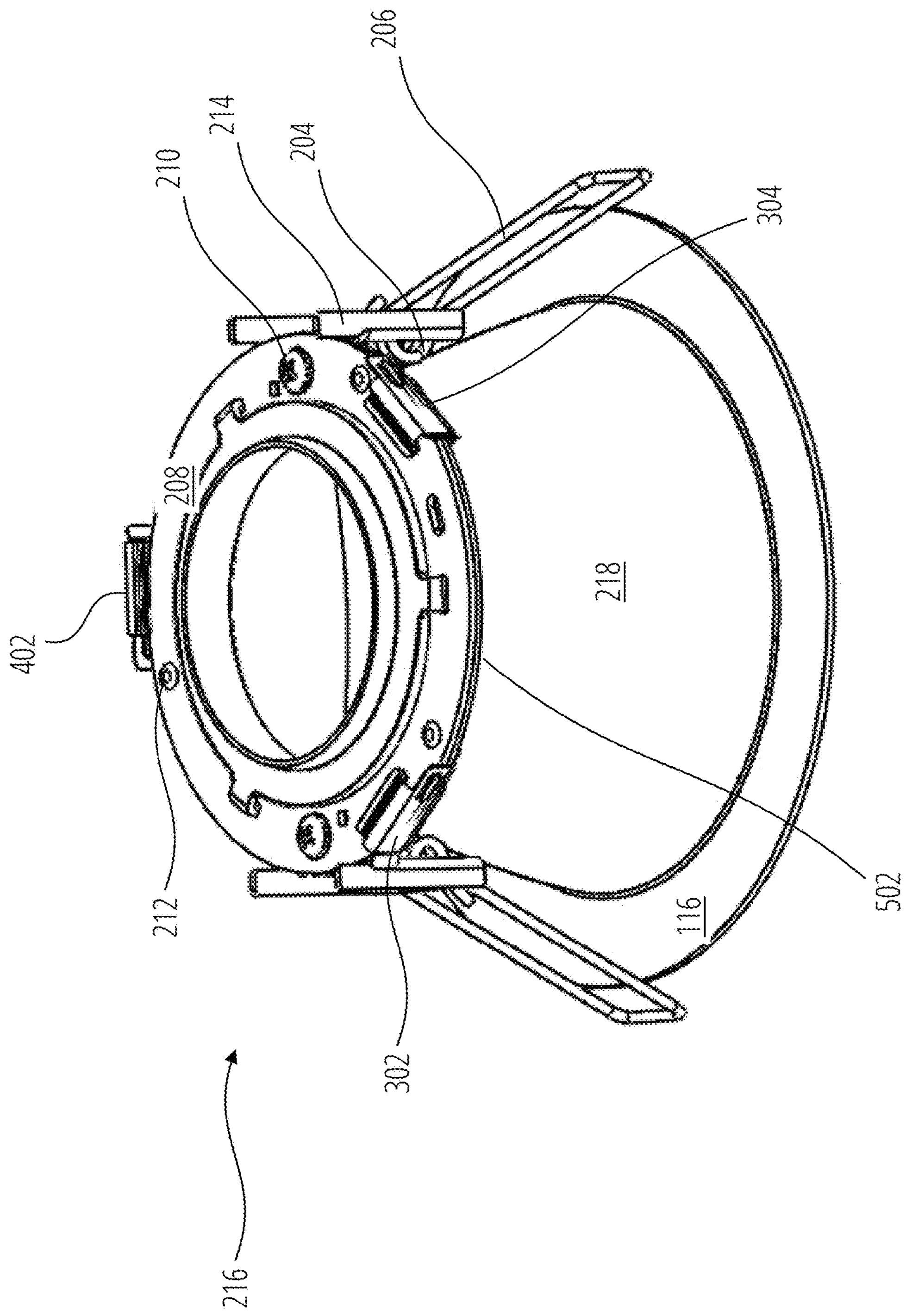
FIG. 4 illustrates the recessed lighting luminaire with the mousetrap supports deployed.

FIG. 4 shows the recessed lighting luminaire 216 without the LED module 102. In this view, the mousetrap supports 206 are extended down. In this embodiment, the screw 210 attaches the reflector flange 208 to the reflector flange collar 502 (underneath the reflector flange 208), to the reflector housing 218 and to the mousetrap connector 214. Rivets 212 are also seen on the reflector flange 208 connecting the reflector flange 208 to the reflector housing 218 and the reflector flange collar 502. In some embodiments, the rivets 212 only attach the reflector flange 208 to the reflector housing 218. In other embodiments, the attachment clips 302, 304, 402 are also riveted to the reflector flange 208, the reflector housing 218, and the reflector flange collar 502.

Figure 5:
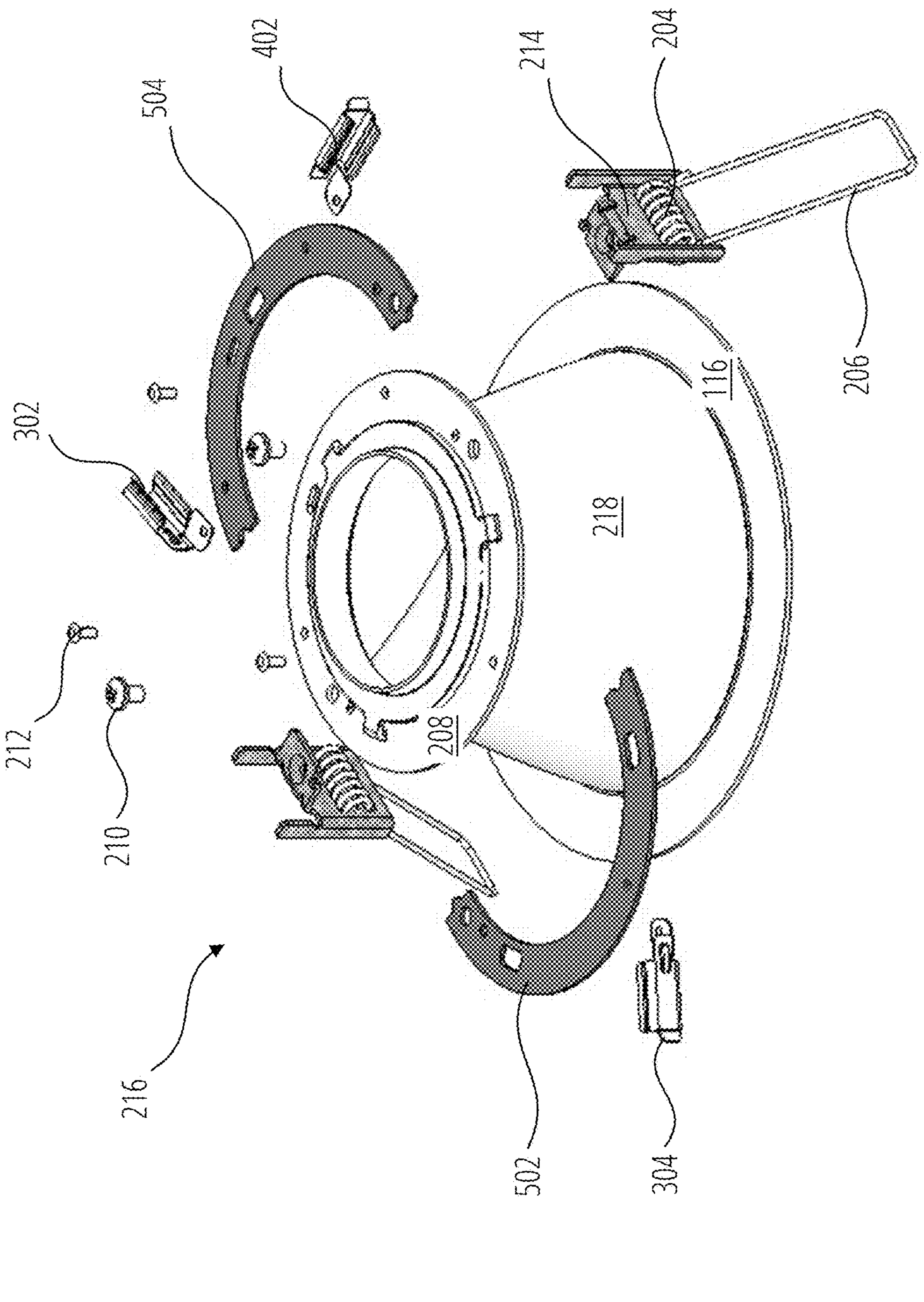
FIG. 5 illustrates an exploded view of the recessed lighting luminaire.

FIG. 5 is an exploded view of the recessed lighting luminaire 216 without the LED module 102. At the top of this view is the reflector flange 208 with its various holes for rivets 212 and screws 210. In some embodiments, the reflector flange collar 502, 504 is mounted below the reflector flange 208. In other embodiments, the reflector flange collar 502, 504 is mounted above the reflector flange 208. A rivets rivet 212 is inserted into a hole in each of the attachment clips 302, 304, 402, and each of the rivets 212 are inserted into holes in the reflector flange 208. The rivet 212 then continues through a hole in the reflector flange collar 502, 504, and then through a hole in the reflector housing 218. The rivet 212 is then formed using a riveting tool, holding the attachment clip 302, the reflector flange 208, the reflector flange collar 502, and the reflector housing 218 together. The mousetrap connector 214 is then screwed into the reflector flange 208, the reflector flange collar 502, and the reflector housing 218 with a screw 210, in this embodiment. The screw 210 is inserted into the hole in the reflector flange 208, through the reflector flange collar 502, 504, the reflector housing 218, and into the threads of the mousetrap connector 214. The screw 210 is tightened to hold the assembly together. In other embodiments, the entire assembly could be held together with one or more attachment mechanisms such as screws 210, nuts and bolts, rivets 212, spot welding, TIG welding, MIG welding, adhesive, clips, or other attachment mechanisms.

The reflector flange collar 502, 504 in the embodiment showing in FIG. 5 in in two parts that combined form a ring shape. The two parts separate at two opposite points on the circular opening, the two opposite points comprising an interlocking pattern with a male rounded tab on one end and a female opening on an opposite end matching the male rounded tab. The reflector flange collar 502, 504 may have a number of holes to accept screws 210, rivets 212, and other openings for attachment.

While the disclosure has been illustrated and described in detail in the drawings and foregoing description, such illustration and description are to be considered illustrative or exemplary and not restrictive. The claimed inventions are not limited to the disclosed embodiments.

The term "substantially equal" may be used to refer to values that are within ±20% of one another in some embodiments, within ±10% of one another in some embodiments, within ±5% of one another in some embodiments, and yet within ±2% of one another in some embodiments.

Other variations to the disclosed embodiments can be understood and effected by those skilled in the art of practicing the claimed inventions, from a study of the drawings, the disclosure, and the appended claims.

In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to obtain an advantage.

Any reference signs in the claims should not be construed as limiting the scope.

LISTING OF DRAWING ELEMENTS

102 LED module
104 electrical box
106 hanger bar bracket
108 control module
110 reflector
112 ceiling
114 mounting frame
116 trim flange
118 upper reflector
120 lens
122 mousetrap support
124 mousetrap spring
202 power wire
204 mousetrap spring
206 mousetrap support
208 reflector flange
210 screw
212 rivet
214 mousetrap connector
216 recessed lighting luminaire
218 reflector housing
302 attachment clip
304 attachment clip
402 attachment clip
502 reflector flange collar
504 reflector flange collar

The invention claimed is:

1. A recessed lighting luminaire comprising:

an LED module;

a reflector being connected underneath the LED module with clips, the LED module shining light through the reflector, the reflector including a reflector flange and a reflector housing, the reflector flange mounted at a top of the reflector housing;

a reflector flange collar attached underneath the reflector flange with an attachment mechanism, the reflector flange collar being positioner tween the reflector flange and the reflector housing and configured to increase stiffness of the reflector flange and to increase thermal dispersion from the LED module into the reflector; and a plurality of mousetrap connectors mechanically adhered to the reflector flange and the reflector flange collar, each of the plurality of mousetrap connectors including a mousetrap spring and a mousetrap support, the mousetrap support configured to hold the recessed lighting luminaire to a ceiling.

2. The recessed lighting luminaire of claim 1 where the attachment mechanism is a screw.

3. The recessed lighting luminaire of claim 1 where the attachment mechanism is a rivet.

4. The recessed lighting luminaire of claim 1 where the reflector flange collar is made of steel.

5. The recessed lighting luminaire of claim 1 where the reflector flange collar is round with a circular opening.

6. The recessed lighting luminaire of claim 5 where the reflector flange collar is two parts.

7. The recessed lighting luminaire of claim 6 where the two parts of the reflector flange collar separate at two opposite points on the circular opening, the two opposite points comprising an interlocking pattern with a male rounded tab on one end and a female opening on an opposite end matching the male rounded tab.

8. The recessed lighting luminaire of claim 1 where the reflector flange is aluminum.

9. The recessed lighting luminaire of claim 1 where the attachment mechanism attaches the reflector flange, the reflector flange collar, and the mousetrap support together.

10. The recessed lighting luminaire of claim 1 where the reflector is conal.

11. The recessed lighting luminaire of claim 1 further comprising an upper reflector between the LED module and the reflector.

12. The recessed lighting luminaire of claim 11 further comprising a lens between the upper reflector and the reflector.

13. The recessed lighting luminaire of claim 1 wherein the mousetrap connectors and the reflector flange collar are integrated.

14. The recessed lighting luminaire of claim 1, wherein each of the plurality of mousetrap connectors is connected to the corresponding mousetrap spring through a pin extending through a center of the mousetrap spring, the pin being connected at one or both ends to the mousetrap connector.

15. The recessed lighting luminaire of claim 1, further comprising a trim flange positioned at a bottom of the reflector housing, the trim flange being configured to prevent the recessed lighting luminaire from being pulled upward into the ceiling when the mousetrap supports are engaged.

16. The recessed lighting luminaire of claim 1, further comprising a plurality of attachment clips configured to clip the LED module to the reflector flange, the plurality of attachment clips being hinged mechanical slide clips.

* * * * *